(12) United States Patent
Führer et al.

(10) Patent No.: US 7,925,411 B2
(45) Date of Patent: Apr. 12, 2011

(54) METHOD FOR CONTROLLING A BRAKE SYSTEM OF A MOTOR VEHICLE WITH ALL-WHEEL DRIVE

(75) Inventors: Jochen Führer, Darmstadt (DE); Lothar Kienle, Lampertheim (DE); Gregor Schmitt, Regensburg (DE)

(73) Assignee: Continental Teves AG & Co. oHG (DE)

( * ) Notice: Subject to any disclaimer, the term of this patent is extended or adjusted under 35 U.S.C. 154(b) by 765 days.

(21) Appl. No.: 11/630,465

(22) PCT Filed: Jun. 22, 2005

(86) PCT No.: PCT/EP2005/052902
§ 371 (c)(1),
(2), (4) Date: Jan. 8, 2008

(87) PCT Pub. No.: WO2006/000560
PCT Pub. Date: Jan. 5, 2006

(65) Prior Publication Data
US 2008/0228368 A1 Sep. 18, 2008

(30) Foreign Application Priority Data

Jun. 24, 2004 (DE) .......................... 10 2004 030 642

(51) Int. Cl.
*B60L 7/18* (2006.01)
(52) U.S. Cl. .............. 701/81; 303/152; 303/3; 303/156; 701/70; 701/69; 701/78; 180/165

(58) Field of Classification Search .................... 701/81, 701/70, 78, 69; 303/152, 157, 3.15, 156, 303/3; 180/165
See application file for complete search history.

(56) References Cited

U.S. PATENT DOCUMENTS

| 5,804,935 | A | * | 9/1998 | Radev | 318/139 |
| 6,086,166 | A | * | 7/2000 | Fukasawa | 303/152 |
| 6,325,470 | B1 | | 12/2001 | Schneider | |
| 6,457,784 | B1 | | 10/2002 | Bohm et al. | |
| 6,691,013 | B1 | * | 2/2004 | Brown | 701/70 |
| 6,816,769 | B2 | * | 11/2004 | Polzin | 701/78 |
| 6,930,405 | B2 | * | 8/2005 | Gunji | 290/40 C |
| 7,104,617 | B2 | * | 9/2006 | Brown | 303/152 |
| 7,136,737 | B2 | * | 11/2006 | Ashizawa et al. | 701/70 |
| 7,198,336 | B2 | * | 4/2007 | Yamamoto et al. | 303/157 |
| 2002/0180266 | A1 | | 12/2002 | Hara et al. | |

FOREIGN PATENT DOCUMENTS

EP 0 361 708 4/1990

* cited by examiner

*Primary Examiner* — Thomas G Black
*Assistant Examiner* — Marthe Marc Coleman
(74) *Attorney, Agent, or Firm* — RatnerPrestia

(57) ABSTRACT

A method of controlling a brake system of an all-wheel driven motor vehicle, which includes an electro-regenerative brake and a number of friction brakes such that a total brake torque comprises brake torque components of the friction brakes and of the electro-regenerative brake; the brake torque of the electro-regenerative brake is subdivided between the front axle and rear axle in predetermined ratios. The brake torque generated by the electro-regenerative brake is limited to such an extent that the brake slip of one axle of the motor vehicle does not exceed a selectable maximum value.

16 Claims, 3 Drawing Sheets

METHOD FOR CONTROLLING A BRAKE SYSTEM OF A MOTOR VEHICLE WITH ALL-WHEEL DRIVE

This application is the U.S. national phase application of PCT International No. PCT/EP2005/052902, filed Jun. 22, 2005, which claims priority to German Patent Application No. DE 10 2004 030 642.7, filed Jun. 24, 2004.

BACKGROUND OF THE INVENTION

1. Technical Field

The present invention relates to a method for controlling a brake system of a motor vehicle with all-wheel drive, in particular for controlling a regenerative brake system with a number of friction brakes and an electro-regenerative brake. The invention further relates to a regenerative brake system for an all-wheel driven motor vehicle.

2. Description of the Related Art

The purpose of regenerative brake systems in motor vehicles involves storing at least part of the energy produced during braking in the motor vehicle and re-using it for the drive of the motor vehicle. This provision allows reducing the energy consumption of the vehicle in total, increasing the efficiency, and thus rendering its operation more economical. To this effect, motor vehicles with a regenerative brake system generally include different types of brakes, also called brake actuators.

Typically, this arrangement employs hydraulic friction brakes, as known from customary motor vehicles, and an electro-regenerative brake. Like in conventional friction brakes, the brake pressure for the friction brakes is generated by means of a brake pressure generating means or by way of the brake pedal movement, respectively. The electro-regenerative brake is generally configured as an electric generator, generating at least part of the total brake output. The produced electric energy is supplied into a storage medium such as an on-board battery, or is fed back, respectively, and is reused for driving the motor vehicle by way of an appropriate drive.

Regenerative brake systems can be designed as so-called serial regenerative concepts where the component of the brake torque, which is produced by the generator, is as high as possible. In contrast thereto, parallel or so-called residual-moment-based regenerative concepts are known as well, where the brake torque is distributed in predefined ratios to the brake actuators. Mixed concepts of these two brake concepts are likewise known. It is common to all systems that they use several brake actuators for simultaneous braking at least in some ranges of the brake torque to be generated so that the total deceleration is composed of the deceleration components of the brake actuators.

In the realization of regenerative brake systems, a motor vehicle is decelerated at a number of axles or, typically, also on all axles of the motor vehicle using friction brakes, each wheel of the corresponding axle being equipped with a friction brake. Depending on the motor vehicle being configured as an all-wheel vehicle or also as a vehicle driven on a single axle, the electric generator is generally connected to both vehicle axles or also to only one axle of the motor vehicle, so that generative brake torque needs to be generated through this axle only. The last-mentioned arrangement exhibits comparatively high efficiency because friction, which reduces the efficiency, is limited only to one of the axles. As an alternative of this concept, a so-called all-wheel concept wherein the generator connects to both axles, may also be put into practice. However, this alternative exhibits poorer efficiency due to higher friction so that it is rarely realized. However, in motor vehicles designed as all-wheel driven motor vehicles anyway, the generator, as has been described hereinabove, connects typically to both or to all of the axles of the all-wheel motor vehicle. Due to the configuration of the drive train in an all-wheel motor vehicle using a regenerative brake system, generally the brake torque is split up between front axle and rear axle in a predetermined fashion. In an all-wheel motor vehicle with two axles, the ratio of brake torques typically is approximately 50%/50% up to 30%/70% as regards the front axle in relation to the rear axle.

It is disadvantageous in a brake system configuration of this type that ideal brake force distribution is not given in at least proportionally regenerative braking. In particular in serial regenerative concepts, but also in parallel and mixed concepts, the result can be that one axle of the motor vehicle is decelerated proportionally at a higher rate than the other axles because a considerable part of the total brake torque is produced by the generator due to the assigned brake torque ratio at one axle. This effect is referred to as overbraking. When one axle is overbraked, the other axles or the other axle are underbraked. Thus, front-axle or rear-axle overbraking of the motor vehicle can occur in all-wheel drive motor vehicles with two axles, depending on how the brake torque distribution between front and rear axles of the generator is, while the respectively other axle is underbraked.

It is disadvantageous and problematic in overbraking that the overbraked wheels will become subject to slip more quickly than the other wheels. This may cause an ABS (Anti-Block System) brake operation being triggered by wheel slip. Consequently, the regenerative brake torque will be reduced completely so that after a short ABS-brake operation, normal braking, only by means of friction brakes, will occur again where brake force distribution is improved or more balanced, respectively. This action provokes an unstable brake feel with the driver. The braking effect as described, where ABS-braking occurs due to overbraking on one axle, is especially unfavorable and unpleasant for the driver in cornering maneuvers and at high deceleration values.

SUMMARY OF THE INVENTION

In view of the above, an object of the invention is to disclose a method for controlling a regenerative brake system of an all-wheel driven motor vehicle, which allows achieving a particularly high rate of stability of a brake operation.

This object is achieved by the invention because the brake torque generated by the electro-regenerative brake is limited in such a fashion that the brake slip of one axle of the all-wheel-driven motor vehicle does not exceed a selectable maximum value.

The invention is based on the reflection that when designing a regenerative brake system with a number of friction brakes and an electro-regenerative brake for an all-wheel driven motor vehicle, there is principally a conflict in goals between maximum high energy recuperation with a great component of electro-regenerative brake torque, on the one hand, and a high rate of stability of the brake operation, on the other hand. It is problematic in this respect that in the event of an increase of the regenerative brake torque component, the brake force distribution shifts in favor of that axle, which is used to generate the greater regenerative brake torque component, and that overbraking of this axle is imminent.

Even in the event of assigned nominal brake torque components between the friction brakes and the electro-regenerative brake, the efficiency of the electro-regenerative brake that varies in the course of speed can cause such an unfavorable brake torque distribution that one axle of the motor vehicle is overbraked and becomes subject to slip.

An ABS brake operation, which occurs due to increase in slip at an overbraked axle, is encountered at a lower rate of deceleration than an ABS brake operation, where overbraking is absent or where brake force distribution between the axles is well balanced, respectively. In order to optimize the conflict in goals between great brake comfort and a high rate of energy recuperation, the brake torque of the electro-regenerative brake should be limited to such an extent that the brake slip of one axle does not be exceed a selectable maximum value.

In order to ensure a balance in brake force distribution when maximum brake slip is reached at one axle, and in order to hence avoid overbraking and that an ABS brake operation commences at too low deceleration, the brake torque of the electro-regenerative brake is favorably reduced starting with the selectable maximum brake slip. Overbraking of one axle is therefore avoided starting with this brake slip, which reflects the top limit value.

The brake torque of the electro-regenerative brake is suitably reduced continuously starting with the selectable maximum brake slip of one axle in order to be able to further generate brake torque by using the electro-regenerative brake when the limit value is exceeded and to thereby achieve a high degree of energy recuperation.

For a compensation of reduced brake torque of the electro-regenerative brake, the brake torque of the friction brakes at the respectively other axle(s) is increased preferably starting with a selectable maximum brake slip of one axle. In a two-axle all-wheel driven motor vehicle, the brake torque of the friction brakes of the front axle increases in the event of a reduction of the brake torque of the electro-regenerative brake if the rear axle has reached maximum brake slip or there is an imminent risk of overbraking. This action is taken in order to maintain the requested total nominal brake torque.

As this occurs, redistribution of the brake torque between the axles is favorably performed so that brake torque of the axle at which the prevailing brake slip has reached a maximum value is shifted to the respectively other axle(s). To this end the brake torque of the electro-regenerative brake, which connects to all axles or to both axles in a two-axle motor vehicle, is reduced, while the brake torque of the friction brakes at the respectively other axle(s) is increased in addition.

In order to regain a comparatively more stable braking situation or a braking situation with reduced brake slip during redistribution of brake torque, the brake torque of the electro-regenerative brake is reduced preferably starting with the selectable limit value in such a fashion that the brake force distribution of the axles of the motor vehicle will suitably approach predetermined nominal values. In this arrangement, the nominal values can be chosen especially in such a way that premature ABS brake operations induced by overbraking are prevented.

To avoid that an axle of the all-wheel driven motor vehicle becomes subject to slip without reducing the brake torque of the electro-regenerative brake, favorably, starting with a selectable maximum brake slip of one axle, the brake slip prevailing at this axle is maintained constant. To this end, a maximum brake slip is chosen such that the corresponding axle does not undergo slip at that moment. If the requested total brake torque continues to rise, the brake torque of the friction brakes of the other axle(s) is increased.

Starting with a selectable maximum brake slip of one axle, either the brake torque of the electro-regenerative brake is reduced or the prevailing brake torque of this axle is maintained constant, favorably in dependence on the braking situation, in order to reach a maximum high rate of stability of a brake operation. In this respect, it is possible to use parameters such as the speed and acceleration of the motor vehicle, and the brake slip and the brake slip variation for this alternative decision.

A correction function compensates such a discrepancy for an efficiency of the electro-regenerative brake or the friction brakes that varies with the speed of the motor vehicle. To this effect, a correction factor is applied to the nominal deceleration of a number of friction brakes or to the nominal deceleration of an electro-regenerative brake by way of determining the prevailing efficiency. The efficiency reflects the ratio of actual and nominal decelerations.

Favorably, a regenerative brake system of an all-wheel driven motor vehicle includes a control unit that is used to control the brake system by means of a method as described hereinabove.

The advantages that can be achieved by the invention in particular involve that the stability of the motor vehicle when slowing down enhances owing to the method described above due to an approach of the brake performance to an ideal brake force distribution. More particularly, this fact can prevent the regenerative brake operation from being discontinued by an ABS brake operation due to the wheels of individual axles overbraking. This allows extending the deceleration range in which regenerative braking is used so that a higher rate of energy can be recovered. The method permits a good compromise between a high rate of driving stability and a maximum high degree of energy recuperation because the regenerative brake operation is not performed until overbraking of one axle, but the brake torque component of the electro-regenerative brake is correspondingly reduced or limited. In this case, any possibly occurring ABS brake operation will thus take place only if it occurred also in pure braking by means of friction brakes.

BRIEF DESCRIPTION OF THE DRAWINGS

An embodiment is explained by way of the accompanying drawings. In the drawings.

DETAILED DESCRIPTION OF THE PREFERRED EMBODIMENTS

Figure 1:
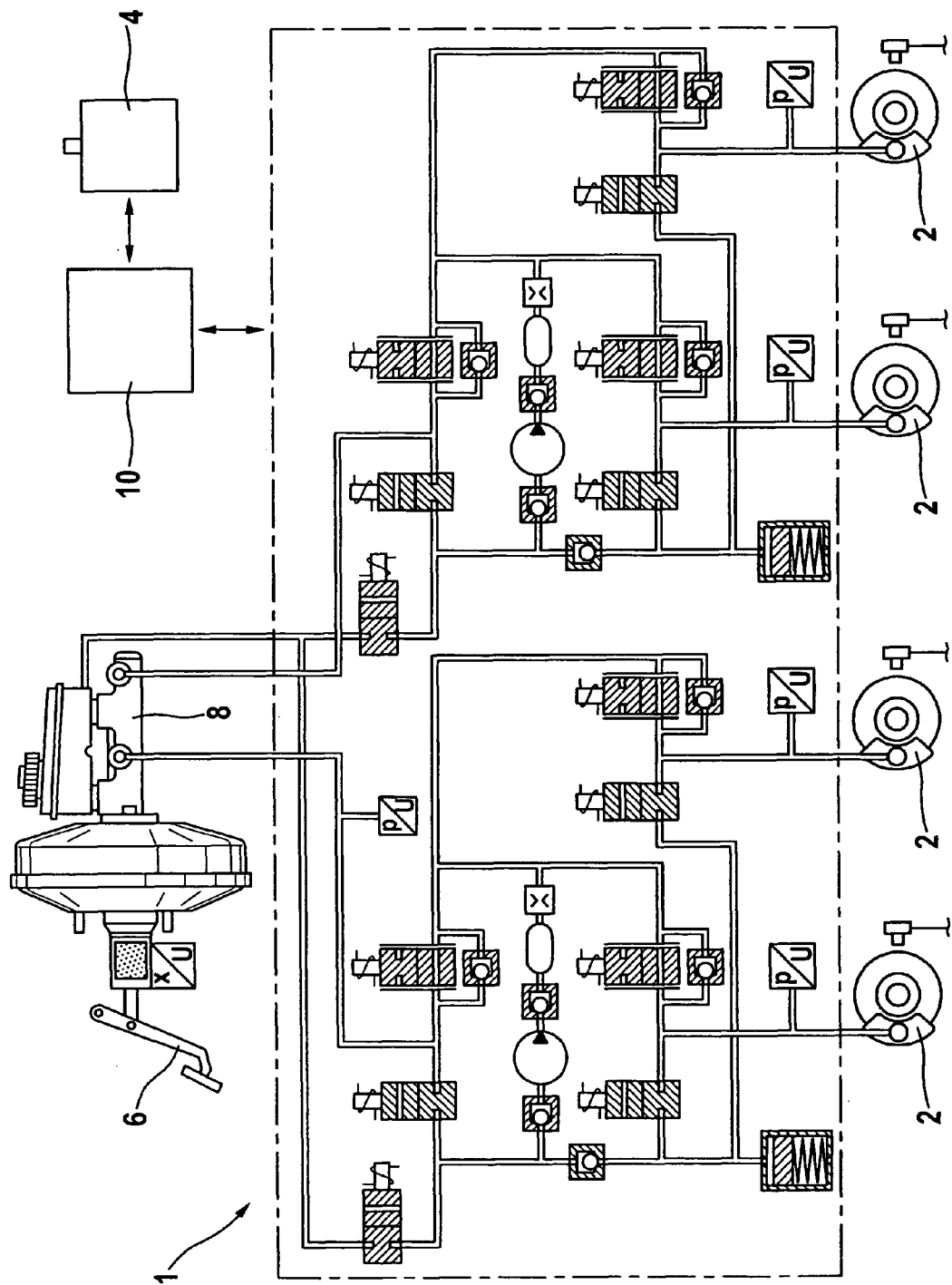
FIG. 1 shows a brake system 1.

The embodiment relates to a method of controlling a regenerative brake system 1 of an all-wheel driven motor vehicle with two axles. As can be taken from FIG. 1, the brake system 1 is equipped with a friction brake 2 on all four wheels, and with an electric generator 4 for the recuperation of electric energy. As cannot be seen in FIG. 1, the generator 4 connects to both axles of the motor vehicle and has a fixed split-up of brake torque between rear and front axles of 70% to 30% due to the all-wheel configuration of the drive train.

The brake system 1 is designed as an electro-hydraulic brake system, wherein the demanded brake torque or the braking request is determined at brake pedal 6. This brake torque is put into practice both using the friction brakes 2 and the electric generator 4, and the brake system 1 is especially rated such as to generate a maximum large portion of brake energy by way of the electric generator 4. The split-up of the brake torque into a regenerative portion by way of the generator 4 and into a portion of the friction brakes 2 is performed by way of the control unit 10.

The generator 4 is actuated electronically, while the necessary brake pressure for the friction brakes 2 is built up using the master brake cylinder 8. The magnitude of the resulting brake torque is controllable in terms of the axles by way of an appropriate valve control, thereby allowing the adjustment of a brake torque ratio between the axles, which suits a braking situation. The adjustment of this brake torque ratio will be explained in detail in the following.

Figure 2:
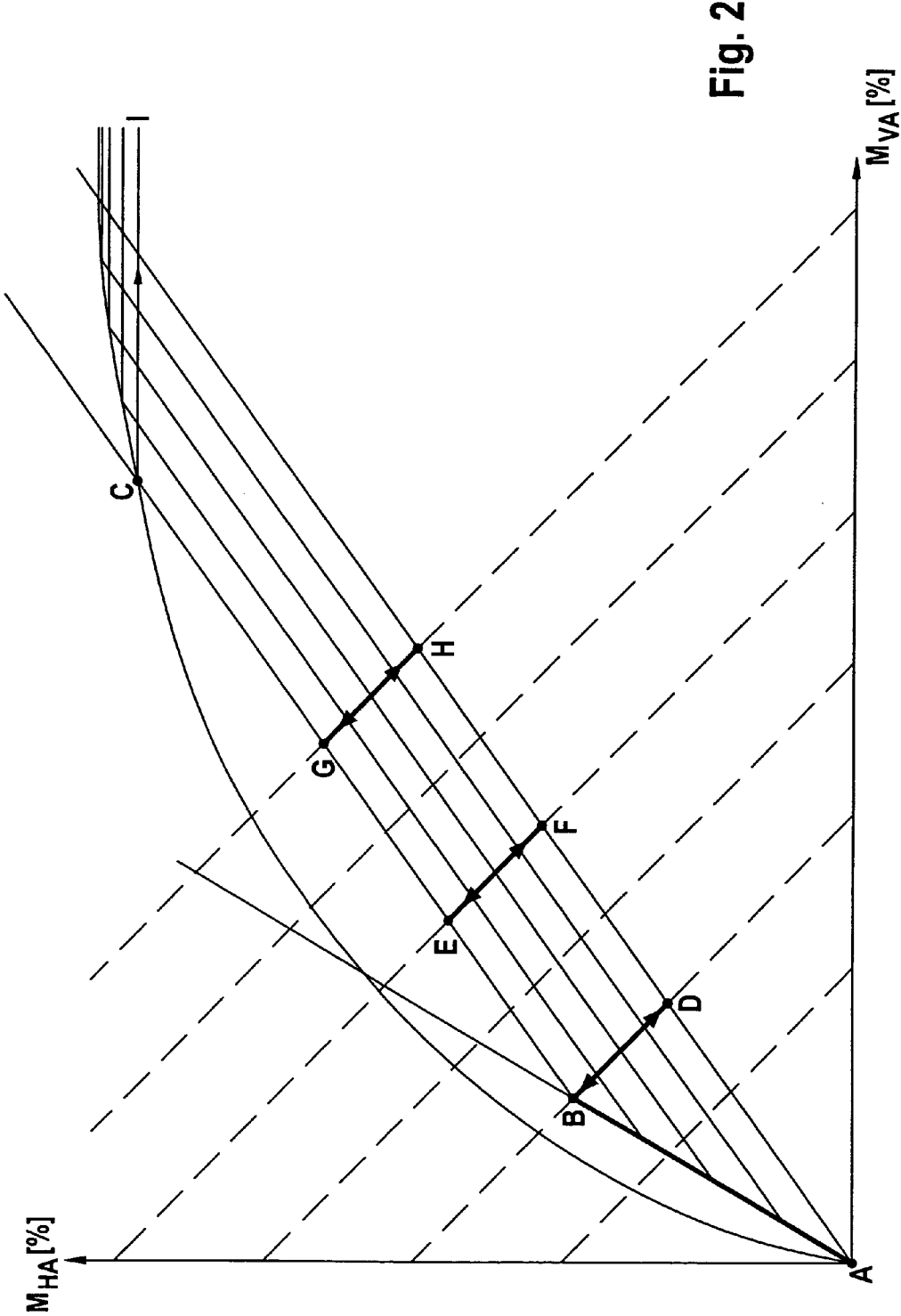
FIG. 2 shows a diagram with the distribution of the brake torque between front axle $M_{VA}$ and rear axle $M_{VH}$ of the brake system 1 according to FIG. 1 in a brake operation with points A to I.

FIG. 2 illustrates a diagram of the distribution of the brake torque between the front axle $M_{VA}$ and the rear axle $M_{VH}$ of the brake system 1 as an example of a brake operation with the states A to I. The brake operation starts at state A by application of the brake pedal 6. As this occurs, initially the generator 4 generates the total brake torque so that with a rising brake torque demand, the brake torque distribution will shift from point A to point B according to the ratio of 70% to 30% of rear axle to front axle. State B characterizes the state of the maximum possible generator brake torque at a currently given speed.

When the brake torque demand exceeds the maximum possible generator brake torque, the friction brakes 2 will generate the additional, required brake torque. The brake torque distribution is then shown on the straight line between the points B and C, with the gradient of the straight line between points B and C resulting from the design of the friction brakes, and various vehicle parameters such as the wheel base and the position of the center of gravity are taken into account as well.

Figure 3:
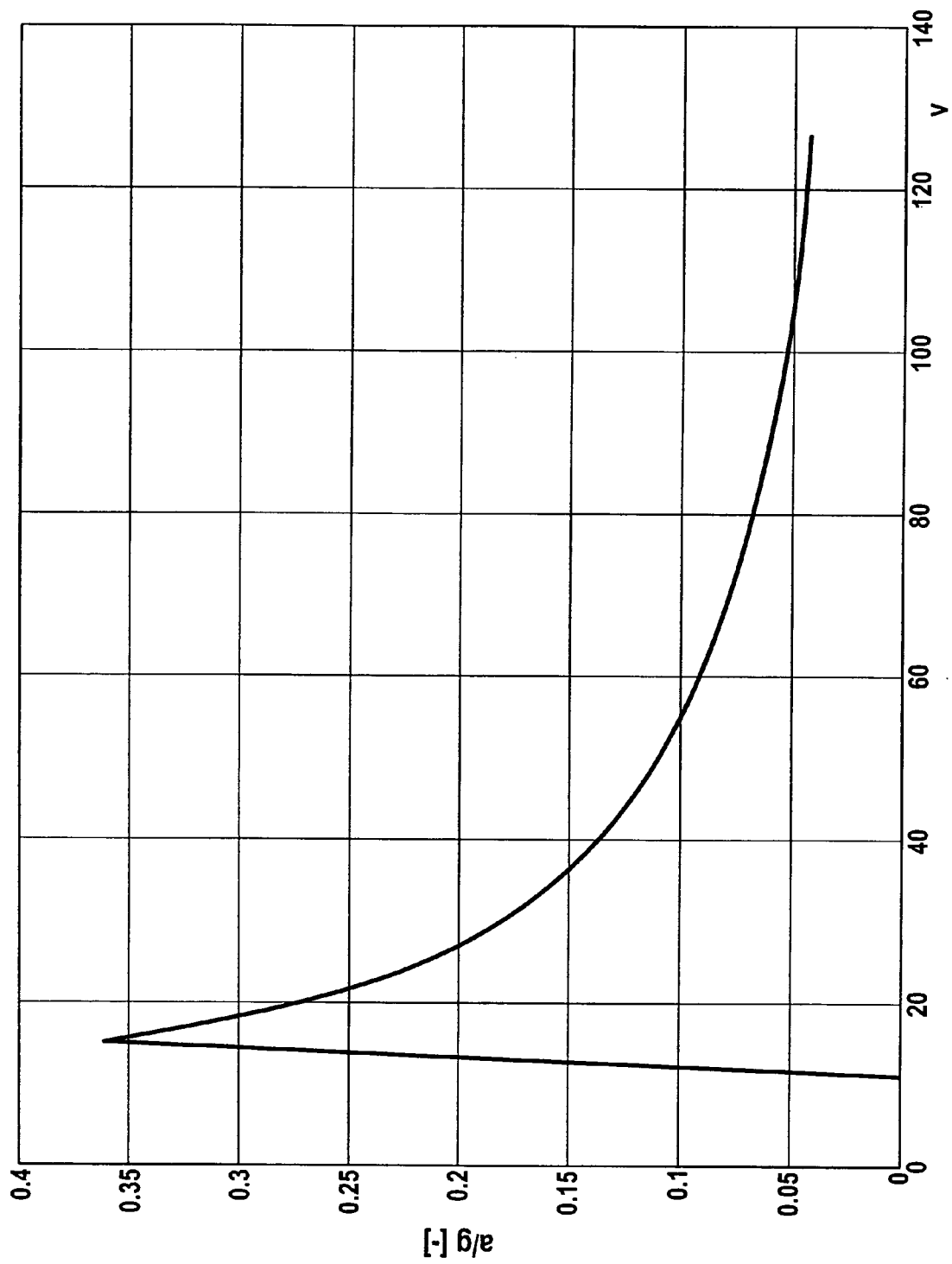
FIG. 3 shows the brake torque variation of an electric generator 4 of the brake system 1 according to FIG. 1.

As can be seen in FIG. 3, the brake torque generated by way of the electric generator 4 is speed-responsive due to the varying efficiency of the generator 4. The brake system 1 is therefore constantly controlled using the control unit 10, and corresponding additional brake torque of the friction brakes 2 is demanded in the event of drop of the maximum generator brake torque, with the share of the generator 4 in the total brake torque being maintained at a highest possible rate. As regards the straight line, the brake torque distribution then moves between the points A and C in a downward direction to the right, and such a speed-responsive transition is shown exemplarily by way of the straight line between the points B and D, E and F, and G and H.

Further, the method is such as to safeguard maximum possible brake stability. To this end, the method is used to actuate the brake system 1 in such a way that it is prevented that one axle will move into slip prematurely or become overbraked, respectively. It is especially taken into consideration that depending on the condition of the roadway, due to the current coefficient of friction of the roadway, only a defined maximum brake torque can be transmitted onto the roadway. To prevent exceeding of a maximum admissible brake slip at one axle, the method provides two different strategies, which are implemented alternatively in response to the respective braking situation. That strategy is always employed that furnishes the best results in view of the current driving or braking situation. It is common to both strategies that as soon as one axle encounters maximum brake slip, brake torque redistribution will be performed axle wise.

As is shown in FIG. 2, according to the first strategy, an abrupt reduction of the generator brake torque is performed e.g. when the rear wheels exceed a maximum admissible brake slip, and this reduced brake torque is compensated by way of an increase of the brake torque $M_{VA}$ of the friction brakes 2 of the front axle. In FIG. 2, this corresponds to a movement on the straight line with the points B and D, E and F, and G and H in a downward direction to the right.

According to the second strategy, the brake torque of the rear axle is maintained constant as a precaution before the rear axle moves into slip, i.e. starting with maximum brake slip. This corresponds to a state on the straight line with the points C and I. If the brake torque demand exceeds the currently prevailing brake pressure, only the brake torque $M_{VA}$ of the front friction brakes 2 will be increased further, with the brake torque ratio shifting in the direction of point I.

The method includes a correction function for the correction of discrepancies of the actual from the nominal deceleration values of the friction brakes 2 and the generator 4, and a suitable correction factor is applied to the respective nominal deceleration corresponding to the actual efficiency, which corresponds to the ratio of actual deceleration to nominal deceleration. The control unit 10 is employed to calculate such a correction factor.

The invention claimed is:

1. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
   subdividing the brake torque generated by the electro-regenerative brake between a first axle of the motor vehicle and a second axle of the motor vehicle in a predetermined ratio; and
   limiting the brake torque generated by the electro-regenerative brake to such an extent that a brake slip of the first axle of the motor vehicle does not exceed a selectable maximum value,
   wherein the brake torque generated by the electro-regenerative brake is reduced continuously when the brake slip of the first axle reaches the selectable maximum brake slip.

2. The method as claimed in claim 1, wherein the brake torque generated by the friction brakes at the second axle is increased when the brake slip of the first axle reaches the selectable maximum brake slip.

3. The method as claimed in claim 1, wherein a redistribution of the brake torque to the second axle is performed when the brake slip of the first axle reaches the selectable maximum brake slip.

4. The method as claimed in claim 3, wherein the redistribution of brake torque is performed until a brake torque distribution between the first and second axles of the motor vehicle approaches a predetermined nominal value.

5. The method as claimed in claim 1, wherein when the brake slip of the first axle reaches the selectable maximum brake slip, a prevailing brake torque of the first axle is maintained constant.

6. The method as claimed in claim 1, wherein when the brake slip of the first axle reaches the selectable maximum brake slip, the brake torque generated by the electro-regenerative brake is reduced or a prevailing brake torque of the first axle is maintained constant depending on the braking situation.

7. The method as claimed in claim 1, further comprising:
   determining a prevailing efficiency; and
   applying a correction factor to a nominal deceleration of the plurality of friction brakes or to a nominal deceleration of the electro-regenerative brake based on the prevailing efficiency.

8. The method as claimed in claim 1, wherein in the predetermined ratio of subdividing the brake torque generated by the electro-regenerative brake between the first axle of the motor vehicle and the second axle of the motor vehicle, the first axle of the motor vehicle receives a higher percentage of the brake torque generated by the electro-regenerative brake.

9. The method as claimed in claim 1, wherein the first axle is a rear axle of the motor vehicle and the second axle is a front axle of the motor vehicle.

10. The method as claimed in claim 1, wherein the first axle is a front axle of the motor vehicle and the second axle is a rear axle of the motor vehicle.

11. A brake system of a motor vehicle, comprising:
    an electro-regenerative brake and a plurality of friction brakes such that a total deceleration comprises deceleration components of the friction brakes and the electro-regenerative brake; and
    a control unit configured to subdivide the deceleration of the electro-regenerative brake between a first axle of the motor vehicle and a second axle of the motor vehicle in a predetermined ratio and limit the deceleration generated by the electro-regenerative brake to such an extent that a brake slip of the first axle of the motor vehicle does not exceed a selectable maximum value,
    wherein the brake torque generated by the electro-regenerative brake is reduced continuously when the brake slip of the first axle reaches the selectable maximum brake slip.

12. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
    subdividing the brake torque generated by the electro-regenerative brake between a first axle of the motor vehicle and a second axle of the motor vehicle in a predetermined ratio; and
    limiting the brake torque generated by the electro-regenerative brake to such an extent that a brake slip of the first axle of the motor vehicle does not exceed a selectable maximum value,
    wherein when the brake slip of the first axle reaches the selectable maximum brake slip the brake torque generated by the electro-regenerative brake is reduced and the brake torque generated by the friction brakes at the second axle is increased.

13. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
    subdividing the brake torque generated by the electro-regenerative brake between a first axle of the motor vehicle and a second axle of the motor vehicle in a predetermined ratio; and
    limiting the brake torque generated by the electro-regenerative brake to such an extent that a brake slip of the first axle of the motor vehicle does not exceed a selectable maximum value,
    wherein when the brake slip of the first axle reaches the selectable maximum brake slip the brake torque generated by the electro-regenerative brake is reduced and a redistribution of the brake torque to the second axle is performed.

14. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
    subdividing the brake torque generated by the electro-regenerative brake between a first axle of the motor vehicle and a second axle of the motor vehicle in a predetermined ratio; and
    limiting the brake torque generated by the electro-regenerative brake to such an extent that a brake slip of the first axle of the motor vehicle does not exceed a selectable maximum value,
    wherein when the brake slip of the first axle reaches the selectable maximum brake slip, a prevailing brake torque of the first axle is maintained constant.

15. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
    subdividing the brake torque generated by the electro-regenerative brake between a first axle of the motor vehicle and a second axle of the motor vehicle in a predetermined ratio; and
    limiting the brake torque generated by the electro-regenerative brake to such an extent that a brake slip of the first axle of the motor vehicle does not exceed a selectable maximum value,
    wherein when the brake slip of the first axle reaches the selectable maximum brake slip, the brake torque generated by the electro-regenerative brake is reduced or a prevailing brake torque of the first axle is maintained constant depending on the braking situation.

16. A method for controlling a brake system of a motor vehicle with all-wheel drive, the brake system including an electro-regenerative brake and a plurality of friction brakes such that a total brake torque comprises brake torque components generated by the friction brakes and generated by the electro-regenerative brake, the method comprising the steps of:
    subdividing the brake torque generated by the electro-regenerative brake between a first axle of the motor vehicle and a second axle of the motor vehicle in a predetermined ratio;
    limiting the brake torque generated by the electro-regenerative brake to such an extent that a brake slip of the first axle of the motor vehicle does not exceed a selectable maximum value,
    determining a prevailing efficiency; and
    applying a correction factor to a nominal deceleration of the plurality of friction brakes or to a nominal deceleration of the electro-regenerative brake based on the prevailing efficiency.

* * * * *